United States Patent
Isono et al.

[15] 3,649,109
[45] Mar. 14, 1972

[54] AUTOMATIC PHOTOGRAPHING DEVICE FOR CINE CAMERA

[72] Inventors: Tadao Isono; Ikuji Katoh, both of Tokyo, Japan

[73] Assignee: Nihon Eigakikai Kabushika Kaisha (Japan Cine Equipment Mfg. Co., Ltd.), Tokyo-to, Japan

[22] Filed: May 11, 1970

[21] Appl. No.: 36,197

[30] Foreign Application Priority Data

May 16, 1969 Japan..................................44/37750

[52] U.S. Cl..............................................352/91, 352/141
[51] Int. Cl. .......................................................G03b 21/36
[58] Field of Search ..........................................352/91, 141

[56] References Cited

UNITED STATES PATENTS

| 3,419,325 | 12/1968 | Mayr et al.................................352/91 |
| 2,518,717 | 8/1950 | Rath..........................................352/141 |
| 3,517,990 | 6/1970 | McGillion et al..........................352/91 |

FOREIGN PATENTS OR APPLICATIONS 1,047,379 11/1966 Great Britain..........................352/141

*Primary Examiner*—S. Clement Swisher
*Assistant Examiner*—Joseph W. Roskos
*Attorney*—William F. Pinsak

[57] ABSTRACT

A movie camera including fade-in, fade-out, and lap dissolve capabilities. To effect fade-out and fade-in exposure, a secondary light sensor is provided in the automatic exposure control circuit and a variable intensity light source acts on the secondary sensor. Suitable mechanisms are provided to permit film reversal and thus allow the superimposition of a fade-in over a fade-out sequence to effect a lap dissolve.

3 Claims, 11 Drawing Figures

Patented March 14, 1972
3,649,109
3 Sheets-Sheet 1
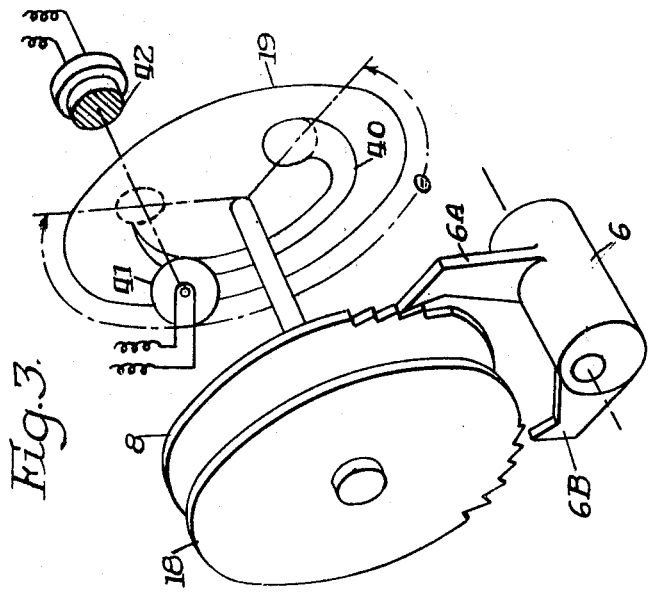
Fig.1.
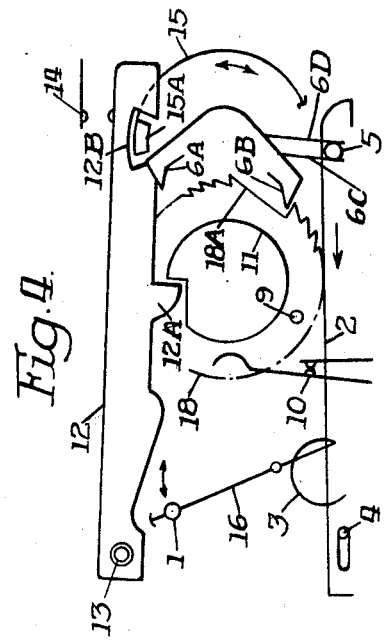
Fig.3.
Fig.4.
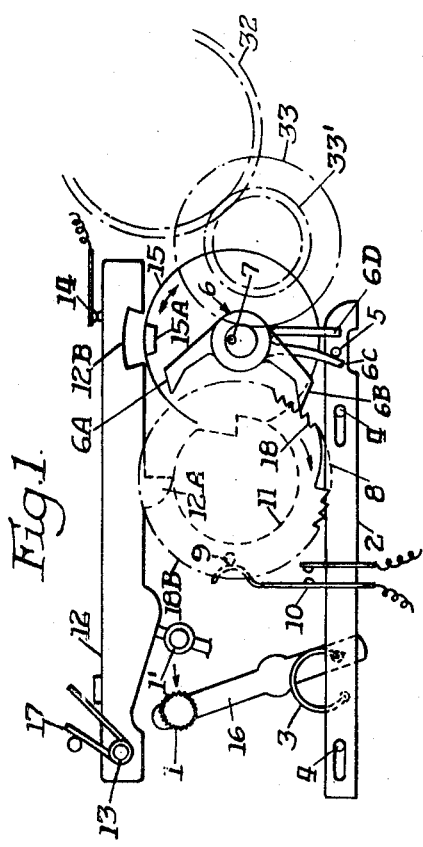
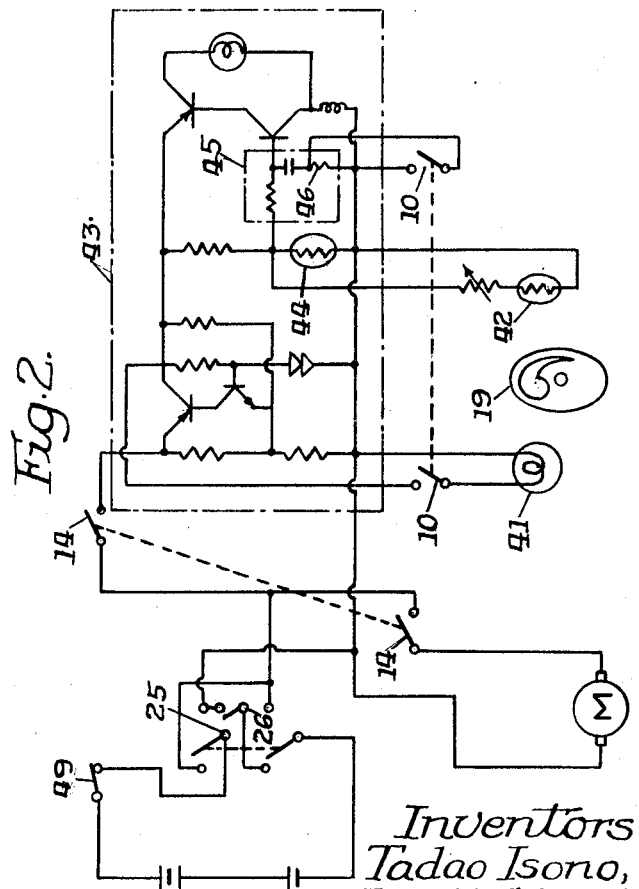
Fig.2.
Inventors:
Tadao Isono,
Ikuji Katoh.
By William F. Russell Atty Patented March 14, 1972
3,649,109
3 Sheets-Sheet 2
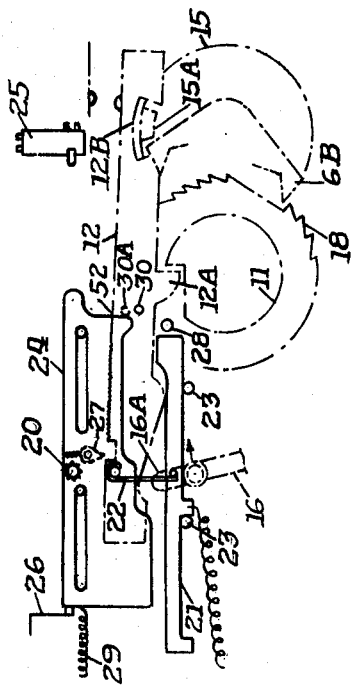
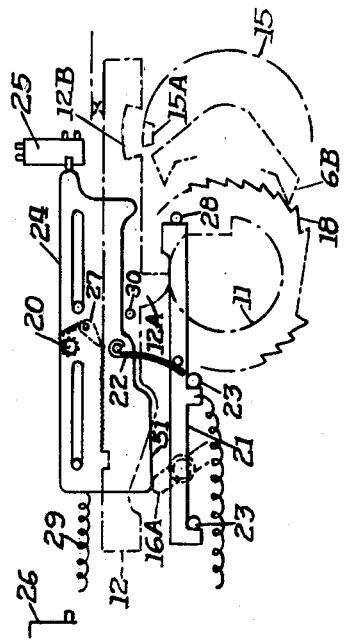
Inventors:
Tadao Isono,
Ikuji Katoh.
By William F. Pinak Atty Inventors:
Tadao Isono,
Ikuji Katoh.

By William F. Kinek Atty

AUTOMATIC PHOTOGRAPHING DEVICE FOR CINE CAMERA

BACKGROUND—SUMMARY

This invention relates to motion picture cameras, and in particular to motion picture cameras including fade-in, fadeout and lap dissolve capabilities.

A fade-in exposure begins with the light level at or near zero and progressively increases the light intensity until exposure is proper for the subject matter being photographed. A fadeout exposure is the opposite of a fade-in and thus gradually diminishes the light level from proper exposure to substantially zero. A lap dissolve sequence includes first a fadeout, then a reversal of the film for the number of frames shot during the fadeout and finally the superimposition of a fade-in thereover.

While cameras with the above-mentioned capabilities are known in the art, they have included complex mechanisms for activating variable density filters in the light path that the film is recording. This invention presents a simplified camera with those capabilities and removes the active member from the image light path.

A secondary photocell is electrically connected with a conventional automatic exposure system contained in the camera. During the fading and lap sequences a light source is activated that illuminates the secondary photocell. By progressively increasing the radiation incident on the secondary photocell the automatic exposure control system will effect a fadeout sequence because the iris will be progressively closed. In opposite fashion, by progressively diminishing the secondary radiation a fade-in sequence may be effected.

Lap dissolve photography is accomplished by combining the fade-in and fadeout mechanisms with suitable film drive reversal apparatus and in some instances coacting means for ceasing film takeup during the fadeout exposure. Furthermore, a safety device may be included to prevent more than a single reversal cycle.

BRIEF DESCRIPTION OF THE DRAWINGS

The features of this invention will become more apparent in the following detailed description when read with reference to the drawings wherein:

FIG. 1 is a side elevational view of a mechanism constructed in accordance with the principles of this invention for effecting fade-in and fadeout photography.

FIG. 2 is a circuit diagram of an automatic exposure control device incorporating a secondary photocell and variable intensity light source in accordance with principles of this invention.

FIG. 3 is a perspective view of a variable intensity light source and associated drive means constructed in accordance with the principles of this invention.

FIG. 4 is a side elevational view of a part of FIG. 1 in a different operating mode.

FIGS. 5 and 6 are side elevational views of a portion of FIG. 1, illustrating a fade-in sequence.

FIGS. 7 and 8 are side elevational views of a lap dissolve mechanism constructed in accordance with the principles of this invention.

DETAILED DESCRIPTION OF THE PREFERRED EMBODIMENTS

Figure 9:
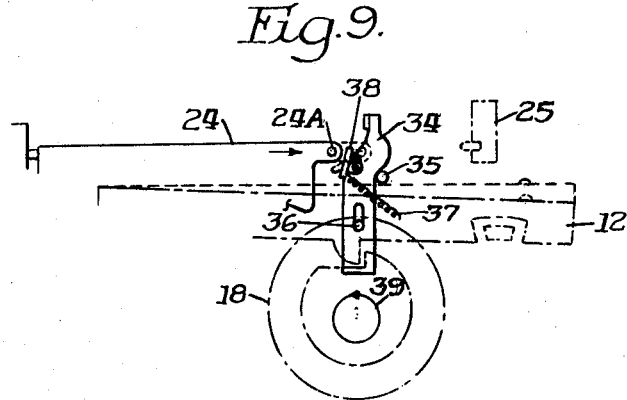
FIGS. 9 and 10 are side elevational views of a safety device for ensuring that only one film reversal may be effected after a given fadeout exposure.

To simplify the understanding of the preferred embodiments the basic components of a preferred fading mechanism will be described and thereafter incorporated into a camera structure. Referring to FIG. 3 it may be seen that the invention includes a secondary or "dummy" light source 41, an apertured disc 19, and a secondary photocell 42. The rotatable apertured disc 19 includes a teardrop shaped aperture 40. The secondary photocell 42 is electrically connected to a conventional automatic exposure control system indicated generally by the reference numeral 43 in FIG. 2.

In the position shown in FIG. 3, no light from the light source 41 will be incident upon the secondary photocell 42 and consequently the camera will be operating in a normal manner. To effect a fadeout sequence from the starting position in FIG. 3, the light source 41 is activated and apertured disc 19 rotated clockwise. As is apparent, progressively more light from the dummy light source 41 will be incident upon the secondary photocell 42 and through the automatic exposure control 43 progressively decrease the camera's iris opening (not shown). To effect a complete fadeout sequence the disc 19 must rotate clockwise through an angle which is equal to about 270°. A fade-in sequence may be produced by rotating the apertured disc 19, 270° counterclockwise from the position assumed at the end of the fadeout sequence to the position shown in FIG. 3.

A pair of toothed discs 8 and 18 cooperating with associated claws 6a and 6b provide the motive force for rotating the disc 19. As will become apparent hereinafter discs 8 and 18 have been illustrated only partially in FIG. 3. A shaft 6 is provided for reciprocating motion to properly engage the claws 6a and 6b with their associated discs. The motive system will now be more fully explained with reference to FIGS. 1 and 4.

FIGS. 1 and 4 illustrate apparatus for activating the dummy light source 41 and rotating the apertured disc 19 during a fadeout sequence. As seen in FIG. 1 the actuating mechanism includes a selector lever 16 shown in its fadeout position 1 and illustrated in phantom in its fade-in/normal position 1'. Moving the selector lever 16 to the left as shown causes a flip-flop spring 3 to urge the fading lever 2 leftwardly until it is stopped by guides 4.

At this point it may be seen that the automatic stopping lever 12 is supported only by a projection 12a extending therefrom that rides on a cam surface 11. As will become more apparent later herein the automatic stopping bar 12 ensures the stoppage of the camera drive at the end of the fadeout sequence.

Returning now to the actuator mechanism, a stud 5 projecting from the lever 2 is urged into contact with a spring lever 6c, extending from the shaft 6. Shaft 6 is integral with crown gear 15 which is connected to the film drive and reciprocates as indicated by the arrows. The action of the stud 5 against the spring lever 6c causes a claw 6b to engage the ratchet teeth on the disc 18. The reciprocating movement of the claw 6b causes clockwise rotation of the disc 18 and as was explained in connection with FIG. 3 thereby begins the fadeout rotation of the apertured disc 19.

The initial movement of disc 18 causes stud 9 attached thereto to rotate and thereby close contacts 10. As is apparent from FIG. 2 that closure activates the dummy light source 41. Although not clearly illustrated herein the teeth on disc 18 are disposed perimetrically about the disc 18 through an angle of 270°. In consequence thereof the action of claw 6a or disc 18 rotates the apertured disc 19, 270° clockwise thus completing the fadeout sequence and ultimately arriving at the position shown in FIG. 4. In FIG. 4 it may be seen that the fadeout claw 6b has arrived at the untoothed portion 18a of the disc 18. Additionally, projection 12a on the automatic stopping bar 12 is no longer supported by cam surface 11 and consequently has dropped inwardly. That causes projection 15a extending transversely from crown gear 15 to be confined within a cutout 12b to prevent further movement of the film drive. Also electrical contact 14 has been broken and as is apparent from FIG. 2 that stops the camera drive M.

Upon completion of a fadeout sequence, a fade-in sequence illustrated in FIGS. 5 and 6 may be effected. In FIG. 5 it may be seen that the selector bar 16 has been moved and pivoted rightwardly thereby causing the flip-flop spring 3 to urge the lever 2 rightwardly. Stud 5 now coacts with spring lever 6d and urges fade-in claw 6a into engagement with toothed portion of disc 8. That toothed portion extends perimetrically through an angle of 270° as with the fadeout disc 18. The movement of the selector bar 16 has forced the automatic stopping bar 12 upwardly such that the crown gear 15 may now rotate and contact 14 is closed to permit actuation of the drive motor M.

By closing the main on-off switch 49 (FIG. 2) a fade-in is initiated. Fade-in claw 6a moves the disc 8 and consequently the apertured disc 19 counterclockwise through an angle of 270° until it reaches the position shown in FIG. 6 and thus has completed the fade-in sequence. It may be seen in FIG. 6 that the fade-in claw 6a now rides in an untoothed portion 8a of disc 8, and stud 9 has opened the electrical contacts 10. Consequently, the discs 8, 18 and the cam surface 11 no longer rotate and the dummy light source 41 has been extinguished. The camera may now be operated normally.

Lap dissolve exposures may be effected by adding components to the fading mechanisms illustrated in FIGS. 1 through 6. Those additional elements in conjunction with the fading elements are depicted in FIGS. 7 and 8. Referring now to FIG. 7 it may be seen that the fading assembly is in the same position as shown in FIG. 4 which is at the end of a fadeout sequence.

To produce a lap dissolve exposure, starting from the position in FIG. 7, a lap lever 24 is moved rightwardly by suitable knob 20. That movement, through the spring 22, causes similar rightward movement of an advance lever 21. As the advance lever 21 moves rightwardly it contacts a stud 28 affixed to the fadeout disc 18 and rotates the fadeout ratchet wheel 18 clockwise until it reaches the position shown in FIG. 8. That position is identical to the initial position of a fadeout sequence as depicted in FIG. 1.

Simultaneously with the repositioning of fadeout ratchet wheel 18, lap lever 24 has contacted and actuated a motor reversing switch 25. A spring biased claw 27 cooperates with notches formed in the automatic stop 12 to keep the reversal switch 25 closed.

Because of the action of the reversing switch 25, activation of the main switch 49 will cause the film drive to operate in a reverse manner, and thereby rewind a segment of exposed film. That reversal sequence begins from the relationship depicted in FIG. 8. From that position, the fadeout ratchet wheel 18 will be rotated clockwise during the reversal sequence through 270° (identical to its movement during the previous fadeout sequence) and the rewind operation will automatically terminate when projection 12a drops into the cam 11 to stop the mechanism as was described in conjunction with FIG. 4.

As the automatic stopping bar 12 falls the claw 27 will be released and the lap lever 24 returned to its initial position by the action of spring 29. Upon completion of this reversal cycle, the fading apparatus is in the position depicted in FIG. 4, and the fade-in cycle may be initiated by moving the selector bar 16 in a rightward manner as depicted in FIGS. 5 and 6. Effecting a fade-in cycle will cause the fade-in to be superimposed over the fadeout thereby producing the desired lap dissolve.

Figure 10:
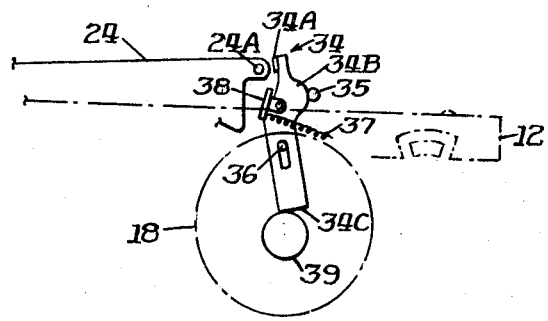

FIGS. 9 and 10 illustrate a suitable safety device for ensuring that only a single reversal cycle may be effected after any given fadeout exposure. The safety device includes a lever 34 whose movement is guided by studs 35 and 36 which are suitably connected to the camera body (not shown). A claw 38 is pivoted to the lever 34 and spring biased downwardly by a spring 37 which may be attached to the automatic stopping bar 12.

In FIG. 9 the safety mechanism is illustrated prior to a reversal sequence. Accordingly, as lap lever 24 is moved rightwardly, a horizontal projection 24a contacts the claw 38 and causes it to pivot rightwardly. That pivoting movement allows the stud 24a to slide over the claw 38 and the lap lever may then be moved further rightwardly to contact the reversal switch 25. As the lap lever 24 is withdrawn from that position stud 24a once again contacts the claw 38. However, the claw 38 does not pivot in a counterclockwise direction and consequently the lever 34 is dropped into that position shown in FIG. 10. It may be seen therein that a subsequent rightward movement of the lap lever 24 would cause projection 24a to contact projection 34a, and since the curved portion 34b of the lever 34 now contacts the stud 35 further rightward movement of the lap lever 24 would be impossible.

However, lever 34 may be reset to the position shown in FIG. 9 by the action of eccentric 39 on the lower portion 34c of the lever 34. One revolution of the eccentric 39 which is integral with the fadeout disc 18 will raise the lever 34 to the position shown in FIG. 9 and consequently a reversal cycle may then be effected.

Figure 11:
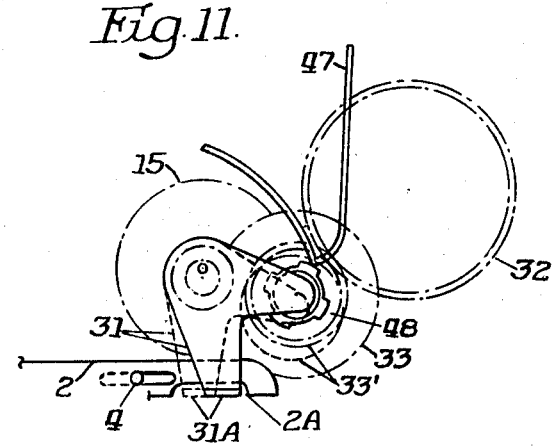
FIG. 11 is a side elevational view of a modification of this invention for use in a camera having synchronized sound capabilities.

A suitable modification is shown in FIG. 11 that permits this invention to be utilized in a camera having sound synchronization capabilities and/or a unidirectional takeup spool contained therein. A suitable sound synchronized system is set forth in U.S. Pat. application, Ser. Nos. 684,254 and 735,731. It is of course desirable to stop the sound synchronization signal when the fadeout operation starts and resume the signal generation upon the initiation of a fade-in sequence.

To accomplish that desired result a cam 48 is integrally mounted with a gear 33 and both are pivoted on a swingable lever 31. Gear 33 is part of the film drive train and causes cam 48 to engage electrical contact 47 at each frame when the swingable lever 31 is in the position shown in solid. The swingable lever 31 is fitted within a slot 2a in the fade lever 2, and consequently will be swung to the position shown in dotted lines during a fadeout exposure. That repositioning causes disengagement of the cam 48 and the contact 47 and thus prevents signal generation during the fadeout.

To accommodate film cartridges which have a reverse interlock, gear 33 may engage takeup gear 32 and consequently during the fade operation will not drive the takeup gear 32. That permits a length of film equal to that used during the fadeout operation to loosely accumulate within the cartridge and be rewound during the aforementioned rewind sequence.

What is claimed is:

1. Fading apparatus for use in a movie camera comprising:
   a light source;
   means for activating said light source during fading exposures;
   a photocell disposed in an area illuminated by said light source for electrical connection with an automatic exposure control device;
   means for varying said illumination incident upon said photocell between zero and an amount sufficient to cause said automatic exposure control to close the iris in said camera.

2. The fading apparatus set forth in claim 6 wherein said means for varying said illumination is a movable teardrop apertured member.

3. A movie camera having fade-in, fadeout and lap dissolve capabilities comprising:
   means for exposing a moving photographic film;
   a variable opening iris;
   an exposure control for properly adjusting the opening of said iris for a given external light intensity;
   said exposure control including a first photocell disposed such that external light is incident thereupon and circuitry for translating changes in the resistance of said first photocell into changes in said iris opening;
   a second photocell incorporated into said circuit and disposed such that no external light is incident thereupon;
   a light source within said camera for illuminating said second photocell; and
   a movable member interposed between said internal light source and said second photocell including a variable sized aperture for altering the light from said internal source that is incident upon said second photocell.

* * * * *